(No Model.)　　　　　　　　S. SMALL.　　　　　　3 Sheets—Sheet 1.
　　　　　　　　　　　　　　Gate.
No. 235,464.　　　　　　　Patented Dec. 14, 1880.
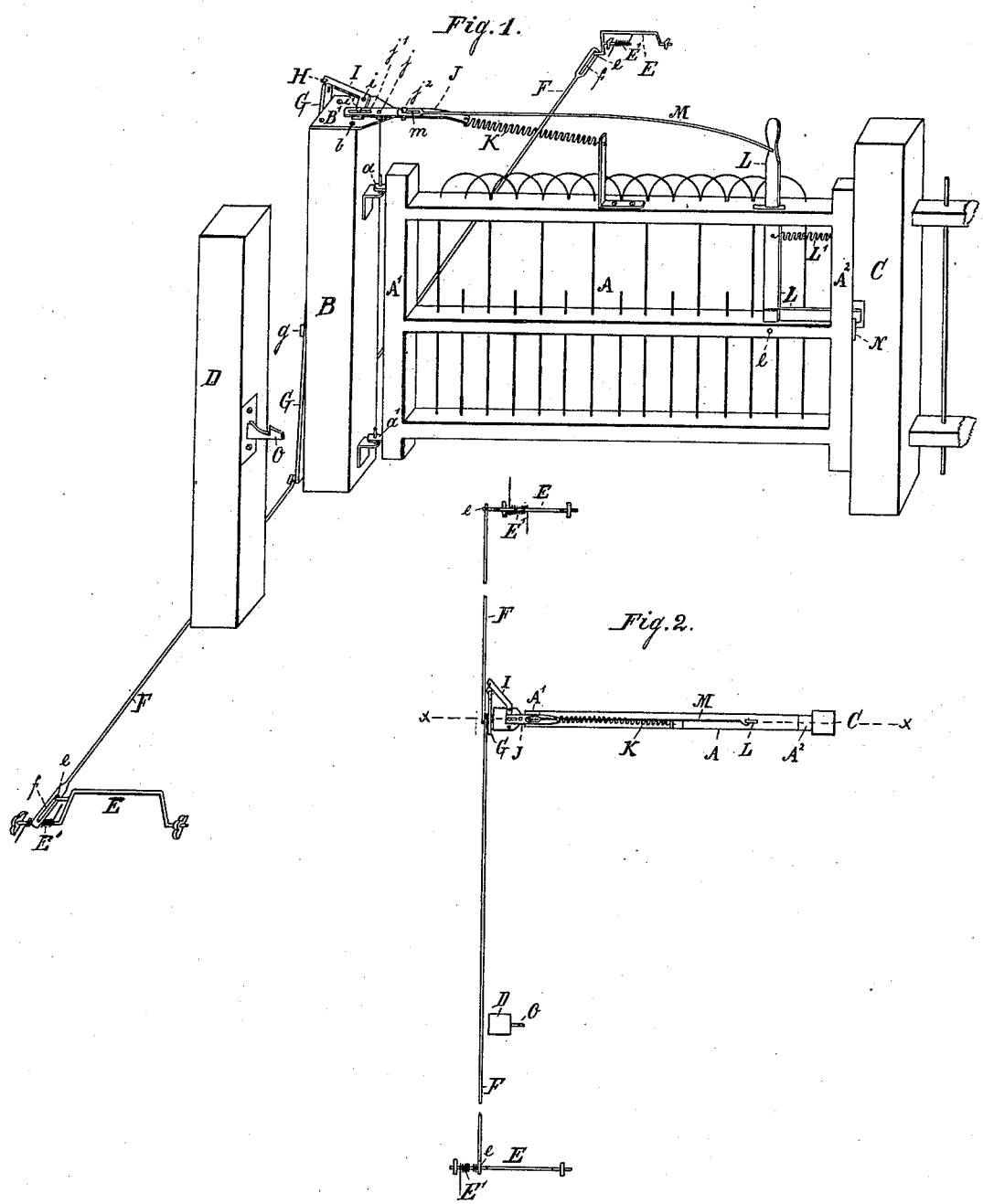
WITNESSES.
James B. Lizius.
R. P. Daggett.
INVENTOR.
Samuel Small,
PER
C. Bradford,
ATTORNEY.

(No Model.)  S. SMALL.  3 Sheets—Sheet 2.
Gate.
No. 235,464.  Patented Dec. 14, 1880.

WITNESSES.
James B. Ligiues.
R. P. Daggett.

INVENTOR.
Samuel Small,
PER C. Bradford,
ATTORNEY.

(No Model.)  3 Sheets—Sheet 3.
S. SMALL.
Gate.
No. 235,464. Patented Dec. 14, 1880.
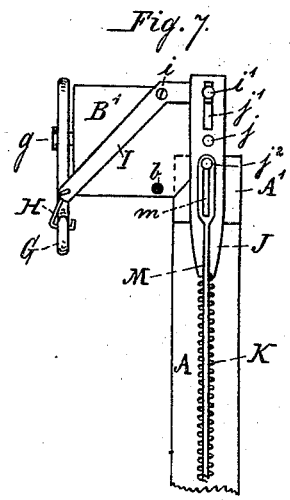
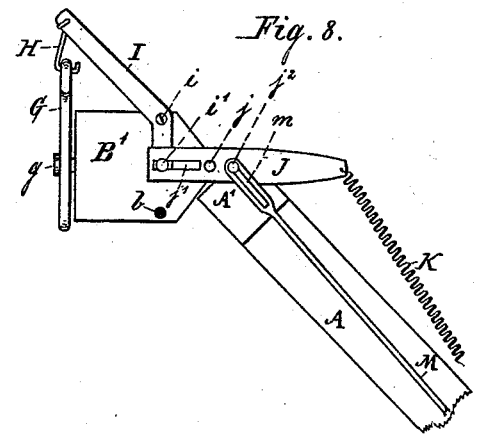
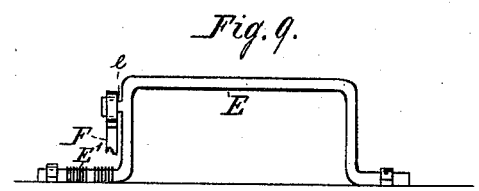
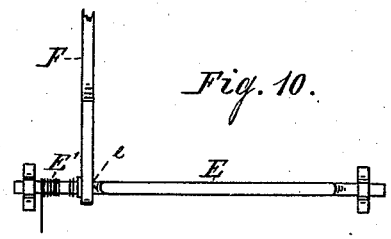
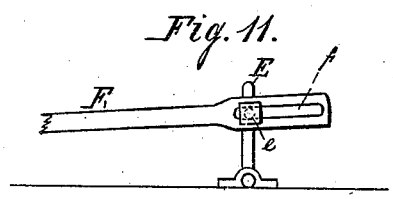
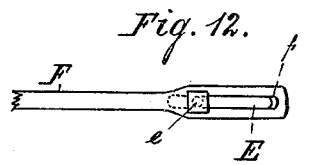
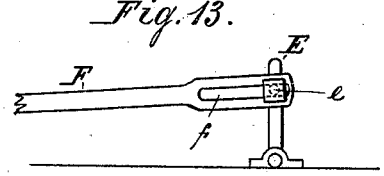
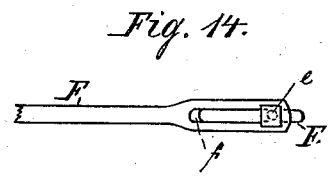
WITNESSES.
James B. Lizius.
R. P. Daggett.
INVENTOR.
Samuel Small,
PER C. Bradford,
ATTORNEY.

UNITED STATES PATENT OFFICE.

SAMUEL SMALL, OF CLAY TOWNSHIP, HAMILTON COUNTY, ASSIGNOR TO SMALL, CAREY & CO., OF CARMEL, INDIANA.

GATE.

SPECIFICATION forming part of Letters Patent No. 235,464, dated December 14, 1880.

Application filed March 12, 1880. (No model.)

*To all whom it may concern:*

Be it known that I, SAMUEL SMALL, of the township of Clay, county of Hamilton, and State of Indiana, have invented certain new and useful Improvements in Gates, of which the following is a specification.

My present invention consist of an improvement upon that for which Letters Patent of the United States No. 221,368, dated November 4, 1879, were granted, of which I was the inventor; and its object is to improve the form of the operating mechanism, so that it shall, among other things, when once fully operated, be automatically held in that position after the vehicle-wheel has passed over the trip-rod, and until the movement of the gate is entirely completed.

Figure 3:
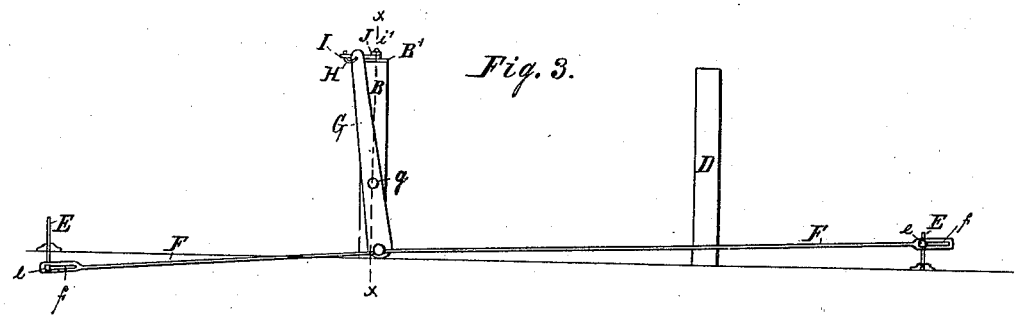
Figure 4:
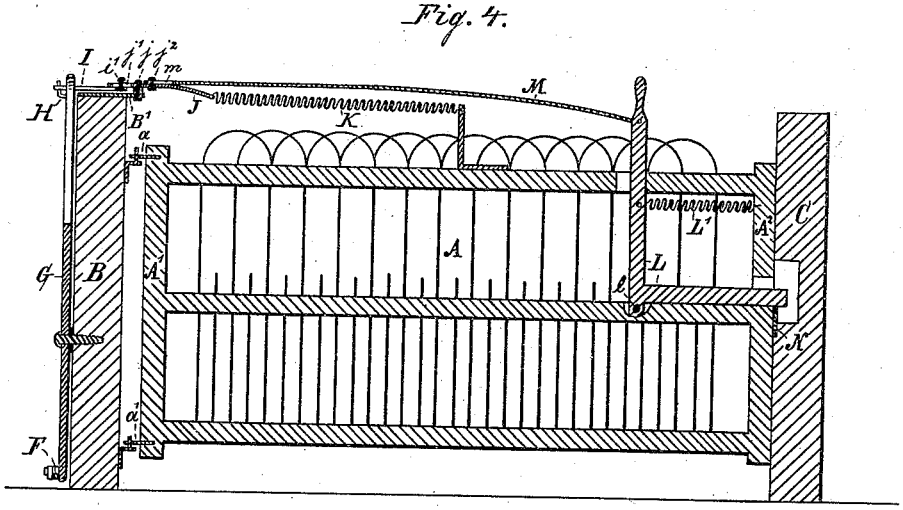
Figures 5, 6:
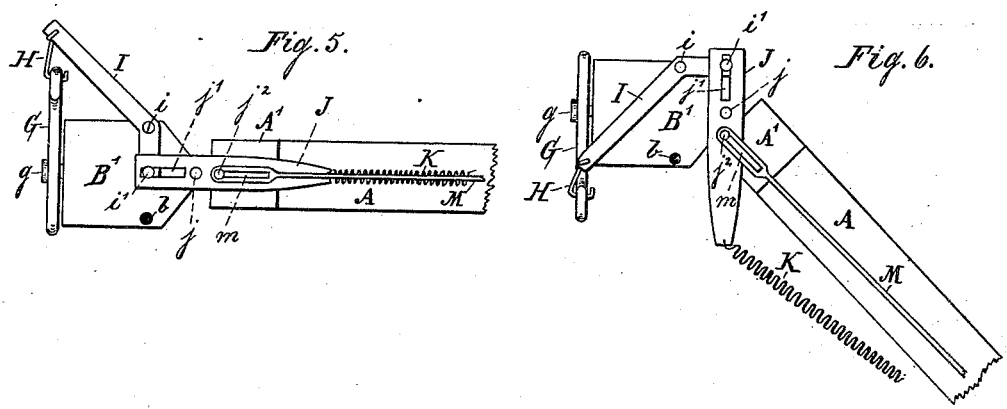

Reference is had to the accompanying drawings, forming part hereof, of which Figure 1 is a perspective view of a gate embodying these improvements; Fig. 2, a top or plan view thereof; Fig. 3, a rear elelevation; Fig. 4, a longitudinal vertical section on the dotted line *x x;* Fig. 5, a plan view of that part of the operating mechanism upon and near to the gatepost and adjacent parts when the gate is at rest in closed position. Fig. 6 is like Fig. 5, except that the mechanism has been operated and the gate has started to swing open. Fig. 7 is a similar view to Fig. 5, except that the gate is in open instead of closed position. Fig. 8 is like Fig. 7, except that the mechanism has been operated and the gate started to swing shut. Fig. 9 is a side elevation of my improved trip-rod. Fig. 10 is a top or plan view thereof. Fig. 11 is an end elevation thereof when the gate is closed and the parts at rest. Fig. 12 is an end elevation thereof when the rod has been forced over in opening the gate. Fig. 13 is an end elevation thereof when the gate is open and the parts at rest; and Fig. 14 is an end elevation thereof when the rod has been forced over in shutting the gate.

As will be noticed, the trip-rod which has been selected to be illustrated is the one toward which the gate swings in opening. The operations of the other are in effect the same, being different in direction of movement only.

In said drawings, the portions marked A represent the gate proper; B, the post to which it is hung; C, the post against which it shuts; D, the post against which it opens; E, the trip-rods over which the wheels or runners of the vehicles pass and thereby operate the mechanism; F, rods connecting the trip-rods to the other mechanism; G, a vertical lever attached to the post B by the pivot *g*, and connected at its bottom with the connecting-rods F F, and at its top, through a connecting-link, H, or other suitable means, to the lever I; I, a lever, pivoted at *i* to the plate B' on the post B, and connected at one end to the lever G, while an upwardly-projecting pin or stud, *i'*, on the other, works into the slot *j'* in the lever J; J, a lever, pivoted at *j* to the plate B' connected to the lever I, as just described, and to the gate itself by a spring, K; L, a latch pivoted at *l* and formed in the shape of a bell-crank; M, a rod or wire connecting the vertical portion of the latch L with a stud, $j^2$, in the lever J; N O, catches upon the posts C and D to engage with the latch L when the gate is in its shut and open positions, respectively, and thus hold said gate.

I will now proceed to describe the specific improvements which I have invented.

The new construction and arrangement of the levers I and J accomplish the first object of my invention. The lever I is pivoted in such relation to the lever J that when the mechanism is fully operated the connecting ends of said levers shall, by means of the sliding joint or connection consisting of the stud *i'* and slot *j'*, be enabled to form nearly or quite a right angle with each other, as shown in Figs. 5, 6, 7, and 8, which forms a sufficiently rigid lock to hold the mechanism in position from the time the wheel passes over the trip-rod until the gate has swung entirely around, thus preventing the gate from flying back when the force of the gate is no longer exerted, which will occur where no means of holding the mechanism in its operated position is employed.

I have found it necessary in my new construction to provide a separate stud, $j^2$, for the rod M in the lever J, instead of attaching it to the pivot of said lever, as in the patent above referred to, and in order that the latch may be, upon occasion, operated independently of the gate-operating mechanism, it is necessary that there be a slot, $m$, in the rod M, or some equivalent means of independently moving said latch, one of which would be the passing of the rod M loosely through a hole in the vertical part of the latch with a head on the end.

I use with my improved gate that form of trip and connecting-rod mechanism which consists of a single loop or bail having an appropriate spring or weight attachment to keep it in upright position, and a connecting-rod attached directly to the side of said bail by means of a pivot-stud, $e$, as shown, said connecting-rod being provided with a slot, $f$, equal, or about equal, in length to the distance from the ground-line to said connecting point $e$. Figs. 11, 12, 13, and 14 show these parts in their various relative positions. The spring E' forces the bail E back to an upright position as soon as the wheel passes over it, and keeps it there until the next occasion of use. The slots in the rods F permit this to be done without occasioning any longitudinal movement of said rods. Another advantage of this construction is that the expansion and contraction of the rods incident to the varying temperature will not operate to pull up the ground-fastenings of the trip-rods, (as in case where they are attached to the connecting-rods in the ordinary manner,) more especially when the slot $f$ slightly exceeds in length the throw of the pivot $e$.

This gate can be operated in the opposite direction to that shown in the drawings by simply turning the lever I the other side up, and inserting its pivot $i$ in the hole $b$ on the opposite side of the plate B'. The pintles of the two gate-hinges $a$ $a'$ and the pivot $j$ are preferably arranged in the same vertical line.

The operation of the gate may be recapitulated as follows: The vehicle-wheels strike the trip-rods E, forcing them over in the usual manner, and through the rods F, lever G, link H, levers I and J, and rod M, operating to unfasten the latch L, and through the same parts, (except the rod M,) and the spring K, operating to pull the gate open or shut, as the case may be.

Having thus fully described my said invention, what I claim as new, and desire to secure by Letters Patent, is—

1. In an automatic gate mechanism, the combination of two levers connected together by means of a sliding joint, and pivoted to stationary bearings in such relation to each other that their connected ends shall be at substantially right angles with each other when the mechanism is in operative position, substantially as and for the purposes set forth.

2. In an automatic gate mechanism, the combination of the lever J, pivoted at $j$, and having the stud $j^2$, the connecting-rod M, having slot $m$, or its described equivalent, and the latch L, all substantially as and for the purposes set forth.

3. The combination of the single bail trip-rod E, the connecting-rod F, having slot $f$, the lever G, the lever I, pivoted at $i$, and having stud $i'$, the lever J, pivoted at $j$, and having the slot $j'$, the spring K, and the gate A, all substantially as shown and described, and for the purposes specified.

In witness whereof I have hereunto set my hand and seal at Indianapolis, Indiana, this 9th day of March, A. D. 1880.

SAMUEL SMALL. [L. S.]

In presence of—
 C. BRADFORD,
 SYLVANUS CAREY.

It is hereby certified that in Letters Patent No. 235,464, granted December 14, 1880, to Samuel Small, for an improvement in Gates, the word "operated" was erroneously printed "operative" in line 57, page 2, of the specification forming a part of said Letters Patent; that the proper corrections have been made in the files and records of this Office, and are hereby made in said Letters Patent.

Signed, countersigned, and sealed this 27th day of January, A. D. 1881.

[SEAL.]

A. BELL,
*Acting Secretary of the Interior.*

Countersigned:
E. M MARBLE,
*Commissioner of Patents.*